United States Patent
Rizzo, Jr. et al.

(10) Patent No.: US 9,802,288 B2
(45) Date of Patent: Oct. 31, 2017

(54) MACHINING SYSTEM HAVING A TOOL FOR FINISHING AIRFOILS

(71) Applicant: United Technologies Corporation, Hartford, CT (US)

(72) Inventors: John P. Rizzo, Jr., Vernon, CT (US); Alan C. Barron, Jupiter, FL (US); Joel H. Wagner, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 202 days.

(21) Appl. No.: 14/741,056

(22) Filed: Jun. 16, 2015

(65) Prior Publication Data

US 2015/0360338 A1   Dec. 17, 2015

Related U.S. Application Data

(60) Provisional application No. 62/012,654, filed on Jun. 16, 2014.

(51) Int. Cl.

| | |
|---|---|
| *B24B 19/14* | (2006.01) |
| *B24B 19/26* | (2006.01) |
| *B24B 49/12* | (2006.01) |
| *B24B 49/16* | (2006.01) |
| *B24B 49/14* | (2006.01) |
| *F01D 5/14* | (2006.01) |

(Continued)

(52) U.S. Cl.
CPC .............. *B24B 19/14* (2013.01); *B24B 17/00* (2013.01); *B24B 19/009* (2013.01); *B24B 19/26* (2013.01); *B24B 27/0038* (2013.01); *B24B 49/12* (2013.01); *B24B 49/14* (2013.01); *B24B 49/16* (2013.01); *B25J 11/0065* (2013.01); *F01D 5/005* (2013.01); *F01D 5/141* (2013.01); *F05D 2220/32* (2013.01); *F05D 2230/14* (2013.01); *Y02T 50/673* (2013.01)

(58) Field of Classification Search
CPC ....... B24B 19/14; B24B 17/10; B24B 19/009; B24B 19/26; B24B 27/0038; B24B 49/12; B24B 49/14; B24B 49/19; B25J 11/0065; F01D 5/005; F01D 5/141; F05D 2220/32; F05D 2230/14; Y02T 50/673
USPC .................................................. 451/5, 6, 44
See application file for complete search history.

(56) References Cited

U.S. PATENT DOCUMENTS

| | | | |
|---|---|---|---|
| 4,015,509 A * | 4/1977 | Malinowski | B23C 3/18 409/119 |
| 4,512,115 A * | 4/1985 | Miller | B24B 19/14 29/404 |

(Continued)

OTHER PUBLICATIONS

EP search report for EP15172416 dated Nov. 30, 2015.

*Primary Examiner* — George Nguyen
(74) *Attorney, Agent, or Firm* — O'Shea Getz P.C.

(57) ABSTRACT

An abrasive profiling tool that may be part of a robotic machining system for machining a trailing edge of an airfoil, includes a shank extending along a rotational axis, a bearing guide rotationally secured to a distal end of the shank for riding upon the airfoil; and an abrasive profiler projecting radially and rigidly outward from the shank for grinding at least the trailing edge as the shank rotates. The profiler may include a round-over portion for grinding the trailing edge and a chamfered blending portion for grinding adjacent surfaces of the airfoil to produce a smooth transition from the adjacent surfaces and to the trailing edge.

9 Claims, 2 Drawing Sheets

(51) Int. Cl.
B24B 17/00 (2006.01)
B24B 19/00 (2006.01)
B24B 27/00 (2006.01)
B25J 11/00 (2006.01)
F01D 5/00 (2006.01)

(56) References Cited

U.S. PATENT DOCUMENTS

| | | | |
|---|---|---|---|
| 5,822,841 A | 10/1998 | Bales et al. | |
| 5,867,885 A | 2/1999 | Bales et al. | |
| 5,994,699 A * | 11/1999 | Akagawa | H04N 5/33 250/332 |
| 7,101,263 B2 | 9/2006 | Schwartz et al. | |
| 7,144,307 B2 | 12/2006 | Schwartz et al. | |
| 7,493,670 B1 * | 2/2009 | Brogan | B24B 23/02 15/230 |
| 7,836,594 B2 | 11/2010 | Rose | |
| 7,846,010 B2 | 12/2010 | Barnat | |
| 7,896,728 B2 * | 3/2011 | Schwartz | B24B 19/14 451/48 |
| 8,216,026 B2 | 7/2012 | Joslin | |
| 8,689,441 B2 | 4/2014 | Guo et al. | |
| 8,710,392 B2 | 4/2014 | Mironets et al. | |
| 8,887,391 B2 | 11/2014 | Barnat | |
| 8,973,264 B2 | 3/2015 | Barnat et al. | |
| 2003/0038332 A1 * | 2/2003 | Kimura | G01J 1/44 257/467 |
| 2005/0126004 A1 * | 6/2005 | Smith | B23H 9/10 29/890.142 |
| 2006/0111032 A1 * | 5/2006 | Weston | B24D 7/18 451/557 |
| 2009/0220349 A1 * | 9/2009 | Bolms | F01D 5/005 416/97 R |
| 2010/0261411 A1 * | 10/2010 | Reinmoeller | B24B 17/00 451/5 |
| 2012/0220194 A1 * | 8/2012 | Maloney | B24B 27/0038 451/5 |
| 2013/0178134 A1 * | 7/2013 | Eriksen | B24B 19/14 451/6 |
| 2013/0189903 A1 * | 7/2013 | Kudas | B24B 19/14 451/5 |
| 2013/0225055 A1 * | 8/2013 | Ng | B24B 19/009 451/548 |
| 2014/0075754 A1 | 3/2014 | Barron et al. | |
| 2014/0093384 A1 | 4/2014 | Mironets et al. | |
| 2014/0113525 A1 * | 4/2014 | Chan | G05B 19/19 451/5 |
| 2014/0323022 A1 * | 10/2014 | Rizzo, Jr. | B24B 19/14 451/541 |
| 2015/0165569 A1 * | 6/2015 | Georgieva | B23P 6/045 228/119 |

\* cited by examiner

MACHINING SYSTEM HAVING A TOOL FOR FINISHING AIRFOILS

This application claims priority to U.S. Patent Appln. No. 62/012,654 filed Jun. 16, 2014.

BACKGROUND

This disclosure relates to a machining system, and more particularly to a profiling tool of the machining system for machining an edge of an airfoil.

It may become necessary to perform finishing operations on an airfoil to complete its manufacture or perform repairs. One common finishing operation is known as machining. A machining operation is often employed to remove excess material from airfoils after a casting process or after a feature of the airfoil is built-up during a repair process. Producing airfoil profiles, shapes and finishes, consistently, accurately and economically is desirable.

SUMMARY

A tool for machining an edge of an airfoil according to one, non-limiting, embodiment of the present disclosure includes a shank extending along a rotational axis, and including a distal end; a bearing guide rotationally secured to the distal end for riding upon the airfoil; and an abrasive profiler projecting radially and rigidly outward from the shank for grinding at least the edge as the shank rotates.

Additionally to the foregoing embodiment, the profiler includes a chamfered blending portion extending axially between a first end adjacent to the bearing guide and a second end, and the first end having a first diameter that is equal to or less than a diameter of the bearing guide and the second end having a second diameter that is greater than the diameter of the bearing guide and the first diameter.

In the alternative or additionally thereto, in the foregoing embodiment, the profiler includes a round-over portion adjacent to the second end for rounding the edge.

In the alternative or additionally thereto, in the foregoing embodiment, the profiler includes an abrasive coating.

A tool for machining a trailing edge of an airfoil according to another, non-limiting, embodiment includes a shank extending along a rotational axis, and including a distal end; and an abrasive profiler projecting radially and rigidly outward from the shank for grinding the trailing edge as the shank rotates.

Additionally to the foregoing embodiment, the profiler includes a chamfered portion extending axially between a distal first end and a second end, and the first end having a first diameter that is less than a second diameter of the second end.

In the alternative or additionally thereto, in the foregoing embodiment the profiler includes a round-over portion adjacent to the second end for rounding the trailing edge.

In the alternative or additionally thereto, in the foregoing embodiment, the tool includes a bearing guide rotationally secured to the distal end of the shank for riding upon the airfoil.

In the alternative or additionally thereto, in the foregoing embodiment, the bearing guide has a diameter that is equal to or greater than the first diameter.

In the alternative or additionally thereto, in the foregoing embodiment, the profiler includes abrasive grains for cutting.

A machining system for shaping a trailing edge of an airfoil according to another, non-limiting, embodiment includes a tool including a shank extending along a rotational axis and an abrasive profiler projecting radially and rigidly outward from the shank for grinding at least the trailing edge as the shank rotates; a robot having an arm engaged to the shank; and wherein the robot is constructed and arranged to apply a specified force between the tool and the airfoil.

Additionally to the foregoing embodiment, the system includes a force feedback device.

In the alternative or additionally thereto, in the foregoing embodiment, the system includes an optical sensor.

In the alternative or additionally thereto, in the foregoing embodiment, the system includes a thermal, infrared, sensor.

In the alternative or additionally thereto, in the foregoing embodiment the profiler includes a chamfered portion extending axially between a distal first end and a second end, and the first end having a first diameter that is less than a second diameter of the second end.

In the alternative or additionally thereto, in the foregoing embodiment the profiler includes a round-over portion adjacent to the second end for rounding the trailing edge.

In the alternative or additionally thereto, in the foregoing embodiment the tool includes a bearing guide rotationally secured to the distal end of the shank for riding upon the airfoil.

In the alternative or additionally thereto, in the foregoing embodiment the bearing guide has a diameter that is equal to or greater than the first diameter.

The foregoing features and elements may be combined in various combinations without exclusivity, unless expressly indicated otherwise. These features and elements as well as the operation thereof will become more apparent in-light of the following description and the accompanying drawings. It should be understood; however, that the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
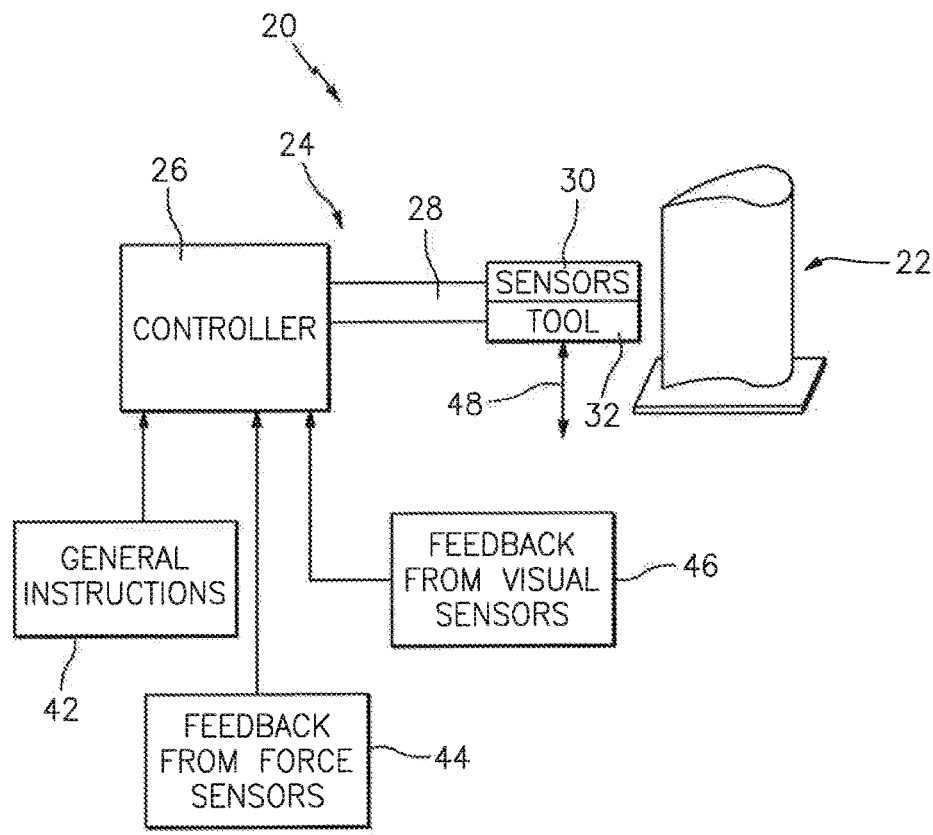
FIG. 1 is a schematic of a machining system in accordance with a non-limiting embodiment of the present disclosure.

Referring to FIG. 1, a machining system 20 of the present disclosure can be used to perform a finishing operation on a component 22, such as an aircraft component, a gas turbine engine component, or any other component. In one example, the machining system 20 may be utilized to finish an edge of an airfoil that may be a trailing edge. The machining system 20 may be a robotic system, an adaptive machining system, a Precision Electrolytic Machining (PEM) system, an Electrical Discharge Machining (EDM) system, an ultrasonic machining system, a Super Abrasive Machining (SAM) system, or any combination of these systems.

The machining system 20 may include a robot 24 having a controller 26, an articulating arm 28, a force feedback device that may have at least one sensor 30, and a profiling grinding tool 32 attached to a distal end or other location of the arm 28. The robot 24 may move the arm 28 to position the tool 32 relative to the airfoil 22 for removal of excess material from the airfoil. More specifically, the tool 32 may be profiled for use on a specific feature of the airfoil 22. The airfoil 22 may be for a fan section, a compressor section or a turbine section of a gas turbine engine. Furthermore, the airfoil may be part of a stationary vane or a rotating blade of the various sections. Regardless of the turbine engine section application, each airfoil 22 generally has a convex, low-pressure, surface 34 and an opposite concave, high-pressure, surface 36. Both surfaces 34, 36 span between leading and trailing edges 38, 40 of the airfoil 22. As one example, the tool 32 may be constructed to shape the trailing edge 40 and generally blend the edge into the adjacent surfaces 34, 36 thereby providing a smooth transition. Machining of the trailing edge 40 may be required after a casting process of the airfoil, or as part of a maintenance or repair process that may include adding of material to the edge (e.g. additive manufacturing) following by the machining operation of the present disclosure.

There is at least one sensor 30 of the force feedback device that may generally monitor the position and shape of the trailing edge 40, and may include a force feedback sensor and a optical sensor. Other sensors can additionally be included, as desired, and this disclosure is not limited to any particular number of sensors. With regard to a force feedback sensor, the sensor may be any type, including "touch" sensors, capacitive sensors, electromagnetic sensors, and piezoelectric sensors, as non-limiting examples. With regard to optical sensors, the sensor may be any type, including visual sensors that include cameras and/or fiber optics. Further, the optical sensors may, alternatively, be infrared and/or thermally sensitive sensors, and do not need to be attached to the free end of the arm 28, and can instead be positioned in some other manner relative to the tool 32. It is further contemplated and understood that the force feedback device may not utilize sensors at the airfoil, but may instead apply pneumatic or electronic compliance technology.

The controller 26 may be programmed with general instructions 42 for machining the trailing edge 40 of the airfoil 22. In one example, the general instructions 42 include at least an identification of the trailing edge 40 and one or both adjacent surfaces 34, 36 to be followed by the tool 32. The general instructions 42 may include at least an amount of force to be applied against at least one of the surfaces 34, 36 and/or edge 40 by the tool 32. In another example, the general instructions 42 may include both an identification of the edge 40 to be followed by the tool 32 as well as the amount of force to be applied against the edge 40 by the tool 32. In other words, the machining system 20 may be either pressure sensitive, visually sensitive, thermally sensitive and/or any combination thereof. The controller 26 may alternatively or additionally be programmed to include and execute other instructions.

During machining, feedback from the sensors 30, illustrated schematically at 44 and 46, is provided to the controller 26 for operating the robot 24. The robot 24 may sense where the trailing edge 40 of the airfoil 22 is and thus follow the edge 40 in response to feedback from the optical sensors 46. In addition, the robot 24 may sense the amount of force that is being applied against the edge 40 by the tool 32 in response to feedback from the force sensors 44. In one example, the arm 28 is actuated to apply the desired amount of a specified force against the edge 40 with the tool 32 and to traverse the tool 32 along the edge 40 to grind off any excess material. In one example, the specified force may be a constant force.

In another example, the feedbacks 44, 46 may additionally indicate that the actual geometry of the edge 40 is different than originally expected. For example, when the edge 40 and adjacent surfaces 34, 36 are lacking in material, the force feedback sensor would provide a lower reading than expected, or indicate that the tool 32 is out of contact with the airfoil 22. When such a difference is detected, the controller 26 may adjust a path (see arrow 48 in FIG. 1) of the tool 32, and may continue to machine the airfoil 22 to provide a desired finish.

Figure 2:
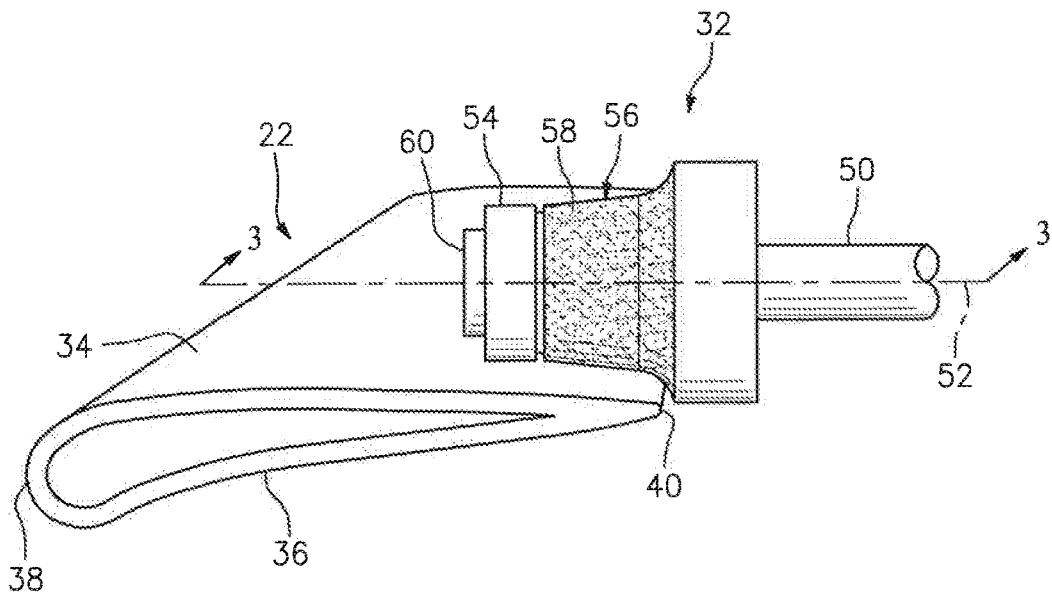
FIG. 2 is a perspective view of a tool of the system acting upon an airfoil.
Figure 3:
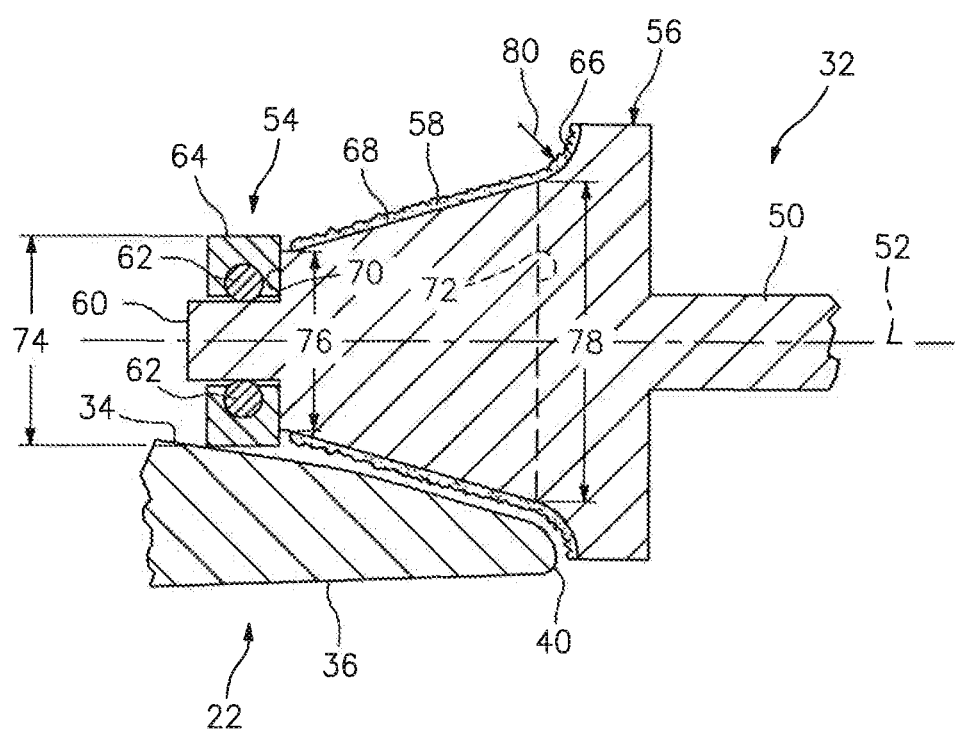
FIG. 3 is a cross section taken along line 3-3 of FIG. 2.

Referring to FIGS. 2 and 3, the profiling, grinding, tool 32 may include a cylindrical shank 50 disposed concentrically to a rotational axis 52, a bearing guide 54, a profiler 56, and an abrasive coating or grains 58 for cutting. At one end, the shank 50 may be disengagably connected to the arm 28 of the robot 24. The robot 24 may include a variable speed motor (not shown) supported by the arm 28 and controlled by the controller 26 for rotating the shank at a desired speed. The shank 50 projects outward from the arm 28 and to a distal end 60 that may support the bearing guide 54. The bearing guide 54 may have a plurality of bearings 62 for substantially friction-free rotation of the guide 54 about the shank 50. The guide 54 further carries a circular, continuous, face 64 that may be cylindrical, or may otherwise conform to an angle of either surface 34, 36 to be blended (i.e. frustum in shape and reflecting the angular relationship between the axis 52 and either of the surfaces 34, 36 of the airfoil 22).

The profiler 56 is rigidly engaged and concentric to the shank 50 and may be one unitary and homogeneous part thereof. The profiler 56 may have a round-over portion 66 and chamfered, blending, portion 68 adjacent to the guide 54 at an axial end 70 and adjacent to the round-over portion 66 at an opposite axial end 72. The blending portion 68 may not generally contact the trailing edge 40 but machines or grinds one of the surfaces 34, 36 to form a smooth transition of the surfaces to the edge 40. The round-over portion 66 does contact and grind the trailing edge 40 and the robot 24 functions to guide the tool 32 so that the longitudinal length or shape of the trailing edge conforms to the desired contour.

As such, the circular face 64 of the guide 54 has a diameter 74 that is equal to or slightly greater than a diameter 76 of the blending portion 68 at the distal end 70, and a diameter 78 of the blending portion 68 at the opposite end 72 is greater than the diameter 74 of the guide 54. The round-over portion 66 of the profiler 56 generally projects radially outward from the end 72 of the blending portion 68 and may have a radius (see arrow 80 in FIG. 3) that generally conforms to the desired radius of the trailing edge 40.

Because of the wide variety of airfoil types and sizes, the radius 80 may range from one to two thousandths of an inch (0.0254 to 0.051 millimeters) for small airfoils to two inches (fifty-one millimeters) or greater for much larger airfoils. The abrasive coating 58 may be plated to the profiler 56 or otherwise adhered, and may be made of diamond, cubic boron nitride (CBN), or other materials known in the abrasive arts. Furthermore, the abrasive coating 58 may be a multi-layered abrasive, or otherwise may take the form of a cutting edge similar to known milling form cutters.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A tool for machining an edge of an airfoil, the tool comprising:
   a shank extending along a rotational axis, and including a distal end;
   a bearing guide rotationally secured to the distal end for riding upon the airfoil; and
   an abrasive profiler projecting radially and rigidly outward from the shank for grinding at least the edge as the shank rotates;
   wherein the profiler includes a chamfered blending portion extending axially between a first end adjacent to the bearing guide and a second end, the first end having a first diameter that is equal to or less than a diameter of the bearing guide, and the second end having a second diameter that is greater than the diameter of the bearing guide and the first diameter.

2. The tool set forth in claim 1, wherein the profiler includes a round-over portion adjacent to the second end for rounding the edge.

3. The tool set forth in claim 2, wherein the profiler includes an abrasive coating.

4. A tool for machining a trailing edge of an airfoil, the tool comprising:
   a shank extending along a rotational axis, and including a distal end;
   an abrasive profiler projecting radially and rigidly outward from the shank for grinding the trailing edge as the shank rotates; and
   a bearing guide rotationally secured to the distal end of the shank for riding upon the airfoil;
   wherein the profiler includes a chamfered portion extending axially between a distal first end and a second end, the first end having a first diameter that is less than a second diameter of the second end;
   wherein the profiler includes a round-over portion adjacent to the second end for rounding the trailing edge; and
   wherein the bearing guide has a diameter that is equal to or greater than the first diameter.

5. The tool set forth in claim 4, wherein the profiler includes abrasive grains for cutting.

6. A machining system for shaping a trailing edge of an airfoil, the system comprising:
   a tool including a shank extending along a rotational axis-end, an abrasive profiler projecting radially and rigidly outward from the shank for grinding at least the trailing edge as the shank rotates, and a bearing guide rotationally secured to a distal end of the shank for riding upon the airfoil;
   a robot having an arm engaged to the shank;
   wherein the robot is constructed and arranged to apply a specified force between the tool and the airfoil;
   wherein the profiler includes a chamfered portion extending axially between a distal first end and a second end, the first end having a first diameter that is less than a second diameter of the second end;
   wherein the profiler includes a round-over portion adjacent to the second end for rounding the trailing edge; and
   wherein the bearing guide has a diameter that is equal to or greater than the first diameter.

7. The machining system set forth in claim 6 further comprising:
   a force feedback device.

8. The machining system set forth in claim 7 further comprising:
   an optical sensor.

9. The machining system set forth in claim 7 further comprising:
   a thermal, infrared, sensor.

* * * * *